US010745130B2

(12) United States Patent
Potter et al.

(10) Patent No.: US 10,745,130 B2
(45) Date of Patent: Aug. 18, 2020

(54) CONTAINER FOR AERIAL DELIVERY (71) Applicant: The Skylife Company, Inc., Rossford, OH (US)

(72) Inventors: Andrew E. Potter, Sylvania, OH (US); Jeffrey J. Potter, Toledo, OH (US); Terry C. Potter, Lambertivve, MI (US); Iain A. McNeil, Sylvania, OH (US); Anthony J. Kujawa, Waterville, OH (US)

(73) Assignee: The SkyLife Company, Inc., Toledo, OH (US)

( * ) Notice: Subject to any disclaimer, the term of this patent is extended or adjusted under 35 U.S.C. 154(b) by 892 days.

(21) Appl. No.: 15/220,657

(22) Filed: Jul. 27, 2016

(65) Prior Publication Data

US 2017/0029108 A1  Feb. 2, 2017

Related U.S. Application Data (60) Provisional application No. 62/197,876, filed on Jul. 28, 2015.

(51) Int. Cl.
*B64D 1/14* (2006.01)
*B64D 17/02* (2006.01)
(Continued)

(52) U.S. Cl.
CPC ............... *B64D 1/14* (2013.01); *B64D 1/08* (2013.01); *B64D 17/02* (2013.01); *B64D 17/18* (2013.01); *B65D 81/052* (2013.01)

(58) Field of Classification Search
CPC . B64D 1/14; B64D 1/08; B64D 25/00; B64D 25/18; B64D 17/22; B64D 17/34; B65D 81/02; B65D 37/00
See application file for complete search history.

(56) References Cited

U.S. PATENT DOCUMENTS 2,495,486 A    1/1950  Stevenson
2,545,248 A *  3/1951  Winzen .................... B64D 1/02
                                              244/138 R
(Continued)

FOREIGN PATENT DOCUMENTS

CA    2377291      9/2003
DE    19940743    4/2000
(Continued)

OTHER PUBLICATIONS

Managed Packaging Systems, Air Pouch, https://www.managedpackaging.com/packaging-materials/air-pouch; archived by Internet Archive on Mar. 21, 2015, https://web.archive.org/web/20150321115520/https://www.managedpackaging.com/packaging-materials/air-pouch/; accessed Jun. 24, 2019 (Year: 2015).*

(Continued)

*Primary Examiner* — Assres H Woldemaryam
(74) *Attorney, Agent, or Firm* — Remenick PLLC (57) ABSTRACT

A container for aerial delivery of a payload is comprised of a box, a lid adapted to close the box, a harness adapted to support the box and lid, a parachute coupled to the harness, and a plurality of inflatable tubes placed within the box and surrounding the payload. The plurality of inflatable tubes adapted to cushion the payload. The parachute has at least one slit adapted to control the descent of the system.

7 Claims, 7 Drawing Sheets

(51) Int. Cl.
*B64D 1/08* (2006.01)
*B64D 17/18* (2006.01)
*B65D 81/05* (2006.01)

(56) References Cited

U.S. PATENT DOCUMENTS

| | | | |
|---|---|---|---|
| 2,687,263 A | 8/1954 | Frieder et al. | |
| 2,712,913 A * | 7/1955 | Stanley | B64D 1/14 |
| | | | 188/266 |
| 2,790,284 A * | 4/1957 | Hultkrans | B65B 31/024 |
| | | | 53/405 |
| 3,050,278 A | 8/1962 | Gardner | |
| 3,115,831 A | 12/1963 | Suter | |
| 3,117,752 A * | 1/1964 | Gillmore | B64D 1/14 |
| | | | 244/138 R |
| 3,168,267 A | 2/1965 | Ferris et al. | |
| 3,279,594 A | 10/1966 | Worthington et al. | |
| 3,401,905 A | 9/1968 | Rohrlick et al. | |
| 3,446,458 A | 5/1969 | Rogallo et al. | |
| 3,491,632 A | 1/1970 | Dovey et al. | |
| 3,724,788 A | 4/1973 | Petry et al. | |
| 3,818,129 A | 6/1974 | Yamamoto | |
| 3,869,842 A | 3/1975 | Verbeke | |
| 4,121,755 A | 10/1978 | Meseke et al. | |
| 4,241,890 A | 12/1980 | Pearson | |
| 4,349,168 A | 9/1982 | Barnes et al. | |
| 4,374,578 A | 2/1983 | Banks | |
| 4,624,407 A | 11/1986 | Janhonen | |
| 5,094,408 A * | 3/1992 | Doherr | B64D 17/14 |
| | | | 244/142 |
| 5,269,119 A | 12/1993 | Tolson | |
| 5,295,580 A | 3/1994 | Hicks | |
| 5,577,689 A * | 11/1996 | Haro | B64F 1/14 |
| | | | 244/138 R |
| 5,771,667 A | 6/1998 | McGregor et al. | |
| 5,779,052 A | 7/1998 | Woodford et al. | |
| 5,947,419 A | 9/1999 | Warren et al. | |
| 6,003,706 A | 12/1999 | Rosen | |
| 6,098,798 A | 8/2000 | Abbott et al. | |
| 6,231,284 B1 | 5/2001 | Kordel | |
| 6,595,344 B1 | 7/2003 | Davis et al. | |
| 6,712,317 B1 | 3/2004 | Warren et al. | |
| 6,817,578 B1 | 11/2004 | Garcia et al. | |
| 8,979,030 B2 | 3/2015 | Potter et al. | |
| 9,296,470 B1 | 3/2016 | Moselage, III | |
| 10,137,986 B1 * | 11/2018 | Bar-Zeev | B65D 81/03 |
| 2003/0197095 A1 | 10/2003 | Preston | |
| 2004/0051006 A1 | 3/2004 | Warren et al. | |
| 2005/0029335 A1 | 2/2005 | Abernathy | |
| 2006/0025293 A1 | 2/2006 | Moen | |
| 2007/0164023 A1 | 7/2007 | Lapoint | |
| 2008/0219830 A1 | 9/2008 | Wells et al. | |
| 2009/0026319 A1 * | 1/2009 | Strong | B64C 39/024 |
| | | | 244/152 |
| 2009/0272852 A1 | 11/2009 | Reynolds et al. | |
| 2011/0133036 A1 | 6/2011 | Goddard et al. | |
| 2012/0043426 A1 | 2/2012 | Potter et al. | |
| 2012/0325693 A1 | 12/2012 | Mooney et al. | |
| 2013/0048787 A1 * | 2/2013 | Riley | B64D 1/08 |
| | | | 244/137.1 |
| 2013/0334371 A1 | 12/2013 | Potter et al. | |
| 2014/0263840 A1 | 9/2014 | Potter et al. | |
| 2015/0069185 A1 * | 3/2015 | Parkinson | B64D 1/14 |
| | | | 244/137.3 |
| 2015/0291298 A1 | 10/2015 | Potter et al. | |

FOREIGN PATENT DOCUMENTS

| | | |
|---|---|---|
| GB | 776950 | 6/1957 |
| GB | 00829401 | 3/1960 |
| WO | WO03016135 | 2/2003 |
| WO | WO2013138703 | 9/2013 |

OTHER PUBLICATIONS

PCT Search Report for PCT/US 16/44183, dated Dec. 9, 2016.
European Search Report of EP 16831267, dated Feb. 21, 2019.

* cited by examiner

CONTAINER FOR AERIAL DELIVERY

REFERENCE TO RELATED APPLICATIONS

The present application claims priority to Provisional U.S. application Ser. No. 62/197,876, filed Jul. 28, 2015 and entitled "Container for Aerial Delivery," which is incorporated in its entirety.

BACKGROUND

1. Field of the Invention

The present invention relates to containers for aerial delivery of objects. More particularly, the invention is directed to containers that are adapted to absorb impact during aerial delivery of objects.

2. Description of the Background

Numerous circumstances require the transport and delivery of various kinds of cargo to inaccessible or remote areas where ground transportation is not possible or timely. For example, in the event that people are trapped or disabled in a remote area, a hostile environment, or an area ravaged by a natural disaster, it may become necessary or desirable to supply them with food, water, medicine, shelter, and other supplies as rapidly as possible. Similarly, in times of warfare, battlefields may be in remote locations or hostile environments. Likewise, it may be necessary to deliver supplies such as fuel to stranded people. Of course, in times of war or other hostilities, it may be essential to provide support to permit the stranded personnel to evacuate the position in which they find themselves.

Many remote locations or hostile environments may be in areas such as deserts or large expanses of otherwise uninhabited or inhospitable terrain. Because of the remoteness of a location or its inaccessibility, supplies are often delivered by air drops from airplanes or helicopters. In the event of natural disasters and other emergencies, time may be of the essence to deliver sustenance, medicine, or other critical items to people cut off from life-sustaining supplies. For example, it might be essential to provide water to people cut off from a clean water supply in the event of flooding, an earthquake, and/or a hurricane.

While in an emergency, the cost of packaging and delivering supplies to those in need may be considered secondary, it is nevertheless important to provide packaging for the supplies that can be formed and distributed on a reasonably cost-effective basis. Also, the space taken up by the containers or packages, as well as the amount and cost of material from which the containers are fabricated, should be minimized to increase the cost effectiveness thereof.

In the past, relief supplies have been delivered by dropping pallets of supplies by parachutes connected to containers. Typically, large amounts of supplies are stacked on multiple pallets and parachutes are connected to the pallets. If the parachutes are undersized or fail, the containers descend at a rapid rate and the container may be ruptured and the contents thereof lost, or people on the ground may be harmed by the rapidly-descending containers. Certain items, often referred to as "undroppables," are known to rupture, break, or otherwise arrive in a defective manner even in perfect drop conditions. Undroppables may include, for example, water, cooking oil, motor oil, gasoline, other liquids, grains, building supplies, food, medication, sensitive electronic equipment, other solids, or other materials that are prone to damage upon impact with the ground. Furthermore, if the supplies are stacked together on a pallet and the pallet air drop is off target, the supplies may be unrecoverable by those in need. Even if the pallet of supplies is recoverable, bandits or guerillas have been known to hoard the supplies and either keep them from people in need or ransom the supplies.

There is a continuing need for a cost-effective package for emergency supplies that may be easily air dropped and distributed to a large number of people with a minimized risk of damage to the supplies and harm to the people collecting the supplies.

SUMMARY OF THE INVENTION

In concordance with the instant disclosure, a container that may be easily air dropped with a minimized risk of damage to the supplies and harm to the people collecting the supplies has surprisingly been discovered.

One embodiment of the invention is directed to a container for aerial delivery of a payload. The container comprises a fixed box, a lid adapted to close the fixed box, and a sleeve surrounding the fixed box, wherein the sleeve is movable between a first, collapsed position and a second, extended position.

The sleeve is preferably maintained in the first position during storage and transportation and transitions to the second position during aerial deployment of the container. Preferably, upon impact with the ground, the sleeve is forced into the first position. Preferably, the movement of the sleeve from the second position to the first position during impact with the ground slows the decent of the container and reduces impact forces over the impact forces experienced by a container without the sleeve impacting the ground.

The container preferably further comprises at least one one-way slide sheet positioned between the fixed box and the sleeve. The one-way slide sheet is preferably adapted to allow unrestricted movement of the sleeve toward the second position and resists of movement of the sleeve toward the first position during impact with the ground. In a preferred embodiment, the one one-way slide sheet is positioned at each corner of the fixed box.

The container preferably further comprises at least one pull strap coupled to the fixed box and the sleeve. Preferably, the pull strap forces the sleeve toward the second position during aerial deployment of the container. In a preferred embodiment, the pull strap is coupled to a parachute. Preferably, the pull strap is weaved through the lid and a hole in the fixed box, and is secured to the sleeve. In a preferred embodiment, the sleeve has a bottom or does not have a bottom. Preferably, the distance between the first position and the second position is at least 6 inches. Preferably, the container is adapted to deliver the payload undamaged.

Another embodiment of the invention is directed to a system for aerial delivery of a payload. The system comprises a box, a lid adapted to close the box, a harness adapted to support the box and lid, a parachute coupled to the harness, wherein the parachute has at least one slit adapted to control the descent of the system, and a plurality of inflatable tubes placed within the box and adapted to cushion the payload.

Preferably, the inflatable tubes are inflated to an internal pressure dependent on the payload. In a preferred embodiment, upon impact with the ground, at least one of the inflatable tubes expels or emits its contents or burst to further cushion the payload. Preferably, there are a plurality of layers of inflatable tubes. The system preferably further comprises a diaphragm positioned between a bottom of the box and the plurality of inflatable tubes. The system preferably further comprises a bag within which the payload is placed. Preferably, the container is adapted to deliver the payload undamaged.

Other embodiments and advantages of the invention are set forth in part in the description, which follows, and in part, may be obvious from this description, or may be learned from the practice of the invention.

DESCRIPTION OF THE DRAWINGS

FIGS. 6-9B are various views of the packed inventive container of FIG. 4.

FIGS. 11-14B are various views of the packed inventive container of FIG. 10.

DESCRIPTION OF THE INVENTION

Providing supplies to a population under emergency conditions is an extremely risky undertaking. Typically, transportation infrastructures have been disrupted, for example, by natural disasters or political or social upheaval. It is often difficult or impossible to truck relief supplies to the disaster area because roads are destroyed and/or access points are blocked. In addition, the relief workers themselves are placed in danger, which may be from environmental concerns (e.g. floods, mudslides, earthquakes, radiation) or dangerous military actions on the ground. Providing supplies by air is often the only viable option in a disaster, but there are still many problems. Because supplies are provided in bulk, the process generally requires precise targeting and coordination with those on the ground to avoid damage to the supplies themselves, damage to structures on the ground, and harm to persons and animals. Whether delivered by truck, ship, or aircraft, supplies are often stolen or confiscated by governments or persons wishing to establish regional political or military dominance. Consequently, the cost of delivery is high and the effectiveness of providing real relief is minimal.

Figure 1:
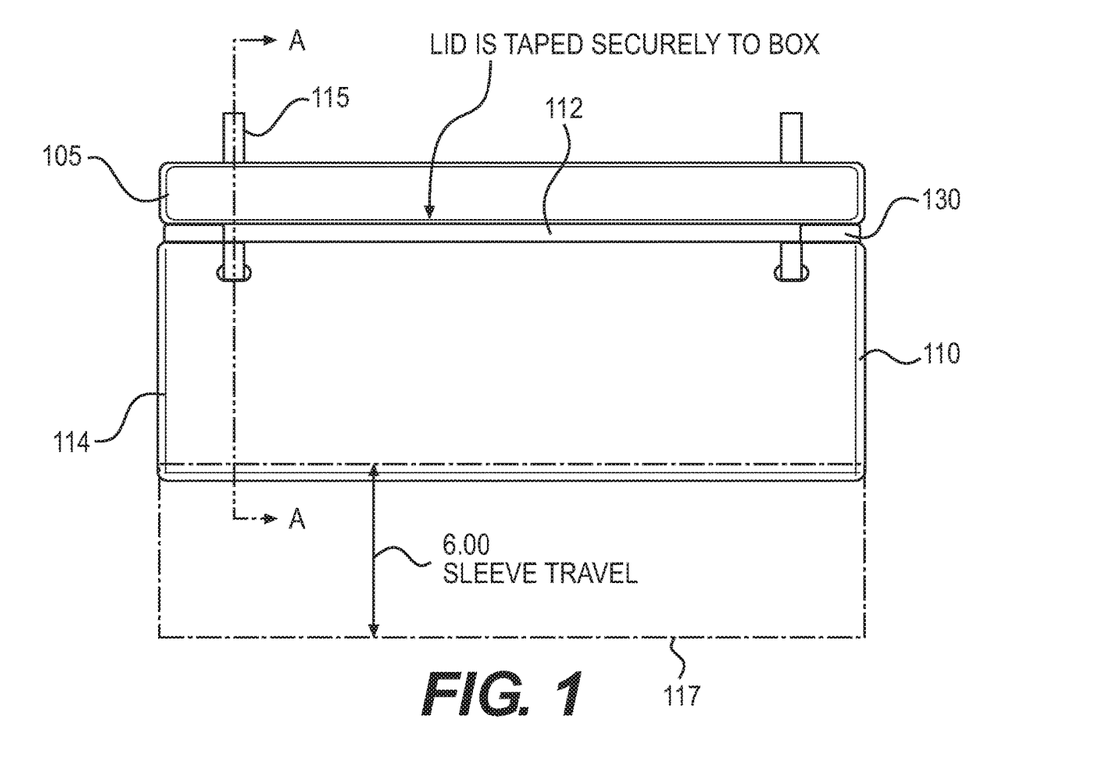
FIG. 1 is a side view of an embodiment of an inventive container.

FIG. 1 depicts an embodiment of an aerial delivery container 100. Container 100 is preferably comprised of a lid 105 and a box 110. Preferably, lid 105 and box 110 are comprised of the same material, however they need not be the same material. For example, lid 105 and box 110 can be comprised of cardboard, plastic, corrugated plastic, metal, wood, nylon, fabric, and/or other manmade or naturally occurring materials. In certain embodiments, the lid 105 and box 110 are formed from a biodegradable material, such as, for example, a polyvinyl alcohol (PVA), polyethylene (PE), polypropylene (PP), or polystyrene (PS). Plastic boxes have the advantage of allowing for extrusion manufacturing and sealing of the boxes with heat to fuse the plastic materials providing a barrier to moisture and other substances, e.g., rendered water-tight. In preferred embodiments, the lid 105 and box 110 may also be formed from a mesh material. In preferred embodiments, the lid 105 and box 110 is formed from a high performance barrier plastic. For example, the high performance barrier plastic can be an oxygen or carbon dioxide scavenger or barrier. Additionally, lid 105 and box 110 may be made of numerous layers and/or corrugated to provide strength. For example, lid 105 and box 110 may have inner and outer layers of polyethylene and a middle layer of rip-stop nylon. In preferred embodiments, lid 105 and box 110 may be coated with a low friction coating (e.g. a lubricant, talcum powder, TEFLON or other polytetrafluoroethylene (PTFE), an oil, or graphite). Furthermore, there may be adhesive between the layers, layers that promote heat seals, and layers that provide optical clarity or opaqueness. Furthermore, the thickness of lid 105 and box 110 can vary depending on the desired attributes of the container 100. A skilled artisan may select suitable materials and number of layers for the lid 105 and box 110, as desired.

Preferably, once box 110 is filled with the payload, lid 105 is secured to box 110. For example, lid 105 can be secured to box 110 with tape, adhesive, staples, bolts, snaps, screws, hook and loop fasteners, brads, pins, rivets, twine, strapping, and/or friction. Preferably, the payload is one or more objects for aerial delivery. For example, the payload can be mosquito netting, blankets, tools, illuminating devices, batteries, tents or other shelters, rain suits or other clothing and foot protection, toilet tissue, cleansing wipes, ammunition, dental hygiene supplies, parts required for vehicle or equipment repair, hunting and fishing tools, water purification pills, a filtered drinking straw to remove contaminants from water, communication and/or navigation devices, heating devices such as those chemically activated to generate heat, video or paper informational instructions furnished to victims of a natural disaster or war, medical supplies, food, cooking materials, water, building supplies, weapons, electronics, household goods, or other supplies. Where the payload is temperature or light sensitive, such as a medication, or flammable, such as fire-starting kits, magnesium blocks for starting fires, or fuels, the container 100 may be formed from a thermally insulating material, for example, a metallic or composite foil. Container 100 may also include a heating or cooling substance or a device to maintain the payload at a desired temperature Container 100 is preferably sized to accommodate the payload therein. Container 100 may be adjustable to fit the payload and then securable in the desired shape. For example, container 100 may be formed of overlapping portions that can be telescoped to fit the payload or container 100 may have walls that expand or collapse to accommodate the payload. Preferably container 100 is adjusted to exactly fit the payload and eliminates as much wasted space within container 100 as possible. Preferably, container 100 contains no packaging materials, stuffing, bubble wrap, inflatable bags, foam, wadding, or other inserts. Preferably, container 100 is sized to prevent the payload from moving within container 100. Preferably container 100 does not have any intentional crumple zones.

Additionally, container 100 is preferably sized to maximize cargo space on the delivery vehicle (e.g. cargo plane). In order to maximize cargo space, box 110 preferably has a fixed portion 112 and a movable sleeve 114. Fixed portion 112 is the portion of box 110 that is secured to lid 105. Preferably, sleeve 114 adapted to slide on fixed portion 112. Sleeve 114 may or may not have a bottom surface. In embodiments where sleeve 114 has a bottom surface, the bottom surface may assist in the stability of container 100 during landing, for example if container 100 is not parallel to the ground upon landing. The inclusion of a bottom surface may additionally provide extra cushioning upon lading due to the compression and release of air between sleeve 114 and fixed portion 112.

Figure 2:
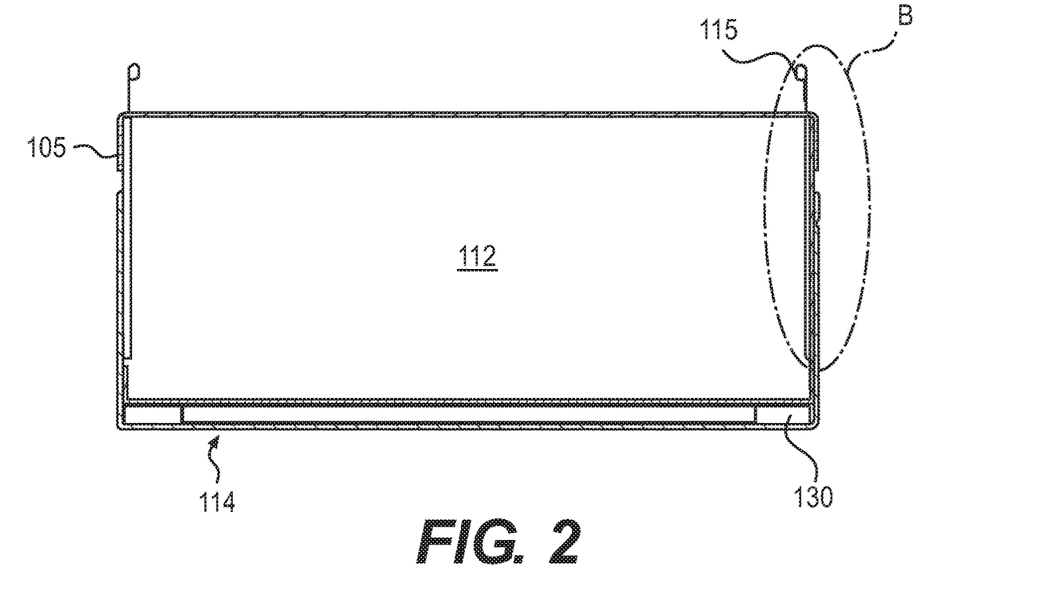
FIG. 2 is a cutaway view of an embodiment of an inventive container.

In a preferred embodiment, during storage and transportation, the bottom of sleeve 114 abuts the bottom of fixed portion 112. In this collapsed position, container 100 has a smaller height than in the expanded position, thereby maximizing storage and cargo space. Upon deployment, preferably, sleeve 114 slides down fixed portion 112, thereby extending the height of container 100. Sleeve 114 may slide, 2, 4, 6, 8, 10, or more inches down fixed portion 112. For example, as shown in FIG. 1, sleeve 114 is in the collapsed position with dotted line 117 showing the fully extended position. Additionally, FIG. 2, shows sleeve 114 is partially extended from fixed portion 112.

Figure 3:
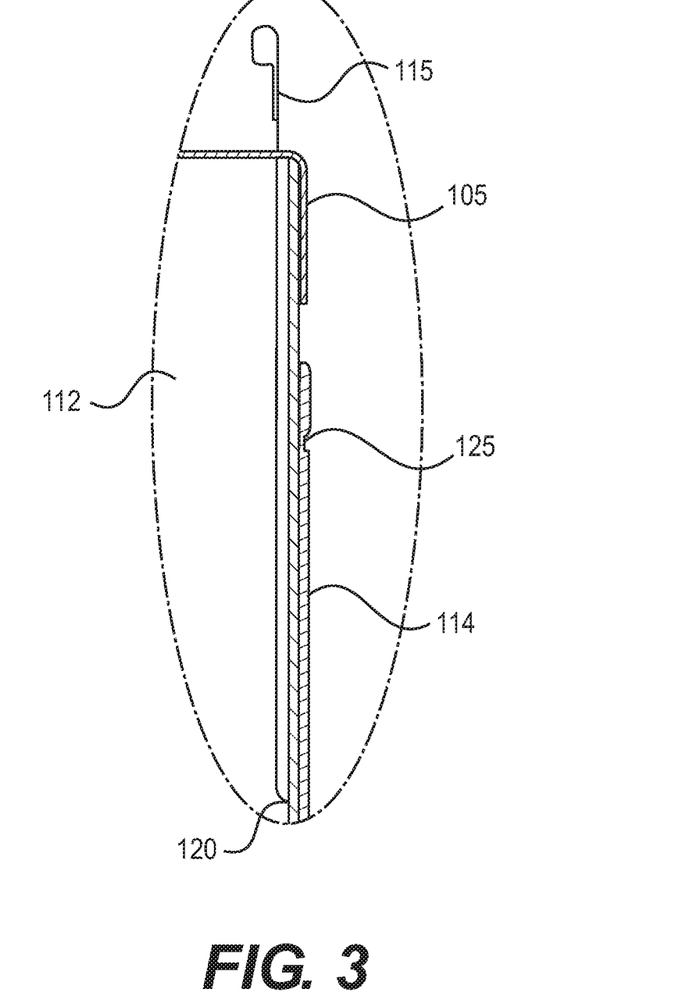
FIG. 3 is a detailed view of a portion of an embodiment of an inventive container.

In a preferred embodiment, in order to force the extension of sleeve 114, container 110 may have pull straps or ribbons 115. Preferably, pull straps 115 are threaded though lid 105 and into box 110. Preferably, fixed portion 112 of box 110 has a thru hole or slot 120 through which pull strap 115 is threaded. Thru hole 120 is preferably positioned toward the bottom of a wall of fixed portion 112. Pull strap 115 is then preferably positioned between fixed portion 112 and sleeve 114. Pull strap 115 is preferably secured to the top of sleeve 114 through a secondary hole 125 near the top of a wall of sleeve 114. Pull strap 115 is preferably made of a flexible, high strength, inelastic material, such as nylon, rubber, chain, plastic, or other naturally occurring or manmade materials.

Pull strap 115 may be secured to a parachute, a deployment system within the transportation vehicle, or another device. Preferably, during deployment of container 100, pull straps 115 are pulled upwards, which, due to the threading of pull straps 115 cause sleeve 114 to move in the opposite direction and slide down fixed portion 112. Upon landing, sleeve 114 is forced upwards due to the contact with the ground, thereby slowing the decent of container 100.

Between sleeve 114 and fixed portion 112 may be placed a one-way slide sheet 130 to decrease the impact force of container 100 with the ground. Preferably a one-way slide sheet 130 is positioned along an edge of each corner of box 110, however more or less one-way slide sheets 130 can be used. One-way slide sheets 130 may be affixed to sleeve 114, fixed portion 112, or both. Preferably, one-way slide sheets 130 allow sleeve 114 to easily move down fixed portion 112. For example, one-way slide sheets 130 may allow for free, unrestricted downward movement of sleeve 114 during deployment of container 100. One-way slide sheets 130 preferably resist the movement of sleeve 114 up fixed portion 112 (e.g. during impact with the ground). By resisting the upward movement of sleeve 114, one-way slide sheets 130 preferably reduce the final impact velocity and effectively cushion the payload upon landing.

For example, one-way slide sheets 130 may consist of two separate components. Component A is preferably molded strip having directional hooks facing in one direction only. Component A is preferably attached to the inside corners of the outer sleeve 114. Component B is preferably a loop pile fabric that the hooks on Component A can easily attach or entangle with. Component B is preferably attached to the outside corners of the inner box 112. These sheet components are preferably used in pairs and are considered the slide sheet assembly 130. The width and length of the slide sheet assembly 130 can be adjusted as needed to adjust the deceleration effect of the one-way slide sheets 130. The frictional breakaway force of the slide sheet assembly 130 is preferably about 54+ lb/in$^2$ in the restricted (drag) direction, while the frictional breakaway force of the slide sheet assembly is preferably less than 2 oz/in$^2$ in the free movement (opposite) direction.

In a preferred embodiment, 12 sq. in. of each slide sheet assembly 130 is positioned at each corner of the assembled package 100. This will result in (48 sq. in.×54 lb.) or about 2,600 lbs. of braking or deceleration force to completely re-collapse the outer sleeve 114. The breaking force may be adjusted by increasing or decreasing the area of the slide sheets 130.

For example, when the falling package 100 first makes contact with the ground it will preferably encounter about 430 lbf of resistant force and the outer sleeve 114 will preferably begin re-collapsing onto the box 112, and thus begin to gradually reduce the impact speed. As the package continues 100 its downward descent, during the next inch of travel, the resistant force will preferably increase to about 860 lbf. During the second inch of travel, the resistant force will preferably increase to about 1290 lbf. All the while, the package 100 has preferably been slowing down. This continues on adding an additional 430 lbf. with each additional inch of collapsing travel until the package 100 comes to a complete rest.

FIGS. 4-9B and 10-14B depict views of other embodiments of aerial delivery containers 400 and 1000. Preferably, containers 400 and 1000 have parachutes and gas filled flexible tubes to slow the final descent of the contained payload 400 and 1000 and cushion the contents of containers 400 and 1000 upon impact with the ground.

Figure 4:
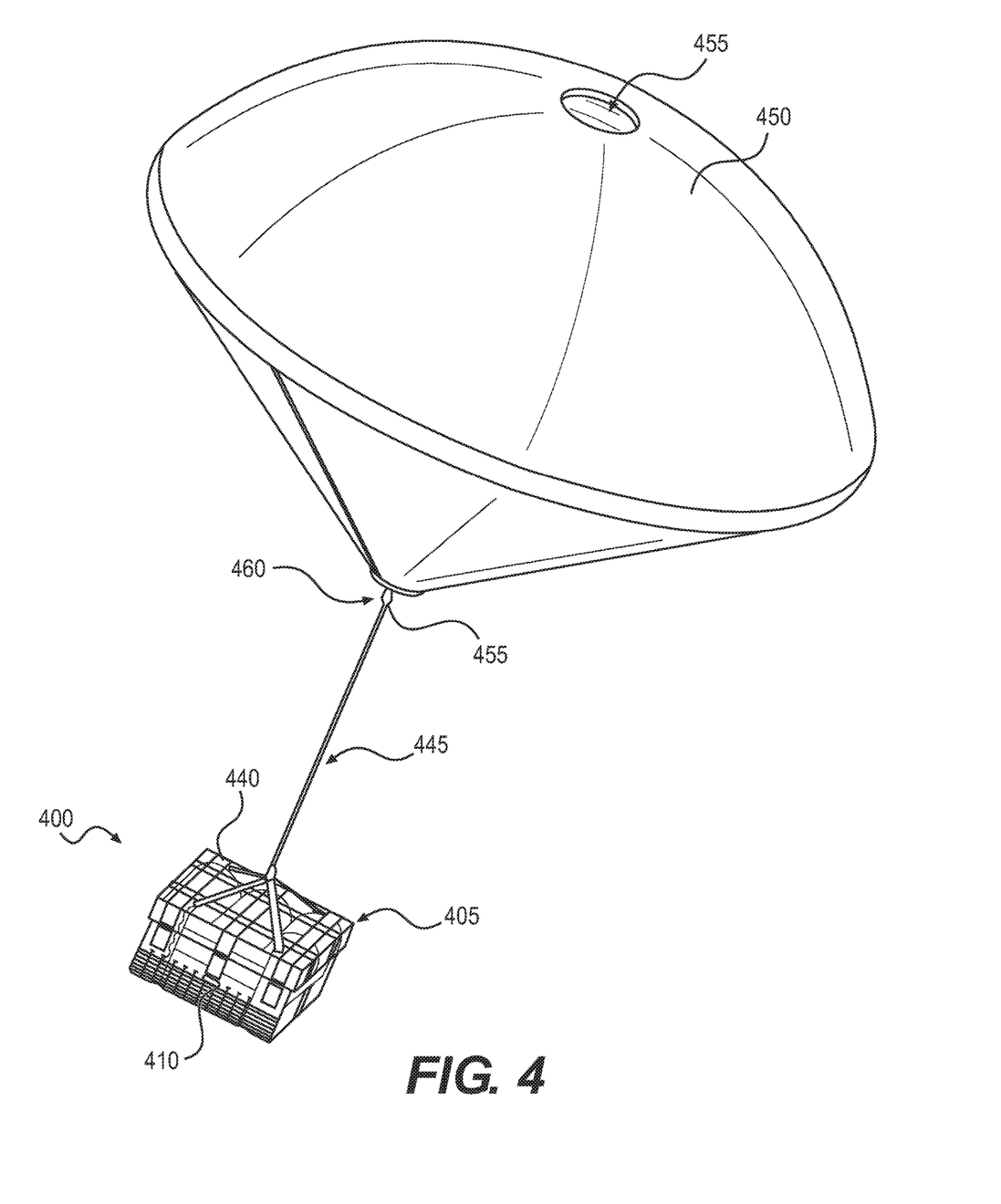
FIG. 4 is a view of another embodiment of an inventive container.

Container 400 is preferably comprised of a lid 405 and a box 410. Preferably, lid 405 and box 410 are comprised of the same material. For example lid 405 and box 410 can be comprised of cardboard, plastic, corrugated plastic, metal, wood, nylon, fabric, and/or other manmade or naturally occurring materials. In certain embodiments, the lid 405 and box 410 are formed from a biodegradable material, such as, for example, a polyvinyl alcohol (PVA), polyethylene (PE), polypropylene (PP), or polystyrene (PS). Plastic boxes have the advantage of allowing for extrusion manufacturing and sealing of the boxes with heat to fuse the plastic materials providing a barrier to moisture and other substances, e.g., rendered water-tight. In preferred embodiments, the lid 405 and box 410 may also be formed from a mesh material. In preferred embodiments, the lid 405 and box 410 is formed from a high performance barrier plastic. For example, the high performance barrier plastic can be an oxygen or carbon dioxide scavenger or barrier. Additionally, lid 405 and box 410 may be made of numerous layers and/or corrugated to provide strength. For example, lid 405 and box 410 may have inner and outer layers of polyethylene and a middle layer of rip-stop nylon. In preferred embodiments, lid 405 and box 410 may be coated with a low friction coating (e.g. a lubricant, talcum powder, TEFLON or other polytetrafluoroethylene (PTFE), an oil, or graphite). Furthermore, there may be adhesive between the layers, layers that promote heat seals, and layers that provide optical clarity or opaqueness. Furthermore, the thickness of lid 405 and box 410 can vary depending on the desired attributes of the container 400. A skilled artisan may select suitable materials and number of layers for the lid 405 and box 410, as desired.

Preferably, once box 410 is filled with the payload, lid 405 is secured to box 410 via securements 440. For example, lid 405 can be secured to box 410 with tape, adhesive, staples, bolts, snaps, screws, hook and loop fasteners, brads, pins, rivets, twine, strapping, and/or friction enhancing materials. Preferably, the payload is one or more objects for aerial delivery. For example, the payload can be mosquito netting, blankets, tools, illuminating devices, batteries, tents or other shelters, rain suits or other clothing and foot protection, toilet tissue, cleansing wipes, ammunition, dental hygiene supplies, parts required for vehicle or equipment repair, hunting and fishing tools, water purification pills, a filtered drinking straw to remove contaminants from water, communication and/or navigation devices, heating devices such as those chemically activated to generate heat, video or paper informational instructions furnished to victims of a natural disaster or war, medical supplies, food, cooking materials, water, building supplies, weapons, electronics, household goods, or other supplies. Where the payload is temperature or light sensitive, such as a medication, or flammable, such as fire-starting kits, magnesium blocks for starting fires, or fuels, the container 400 may be formed from a thermally insulating material, for example, a metallic or composite foil. Container 400 may also include a heating or cooling substance or a device to maintain the payload at a desired tempera Lid 405 and Box 410 are coupled to a parachute 450 via harness 445. Parachute 450 is preferably a device adapted to slow the descent of container 400 during aerial delivery. For example, container 400 may alternatively be coupled to wings, propellers, other canopies, kites, or other devices capable of slowing the descent of container 400. Preferably, parachute 450 has one or more slits or holes 455. Preferably, holes 455 are adapted to control the descent of container 400 during aerial delivery. For example, a specific arrangement of holes 455 may allow container 400 to descend without being jostled or to follow a certain descent path. Harness 445 preferably cradles lid 405 and box 410 via a four-point strapping system. Harness 445 may be threaded through holes in lid 405 and around box 410. Preferably, harness 445 is coupled to parachute 450 via one or more carabineers 455 or other attachment devices. For example, harness 445 can alternatively be coupled to parachute 450 via a bolt, rivets, knots, hook and loop fasteners, staples, or other fasteners. Parachute 450 may have a connector strap 460 to aid in coupling harness 445 to parachute 450.

Figure 5:
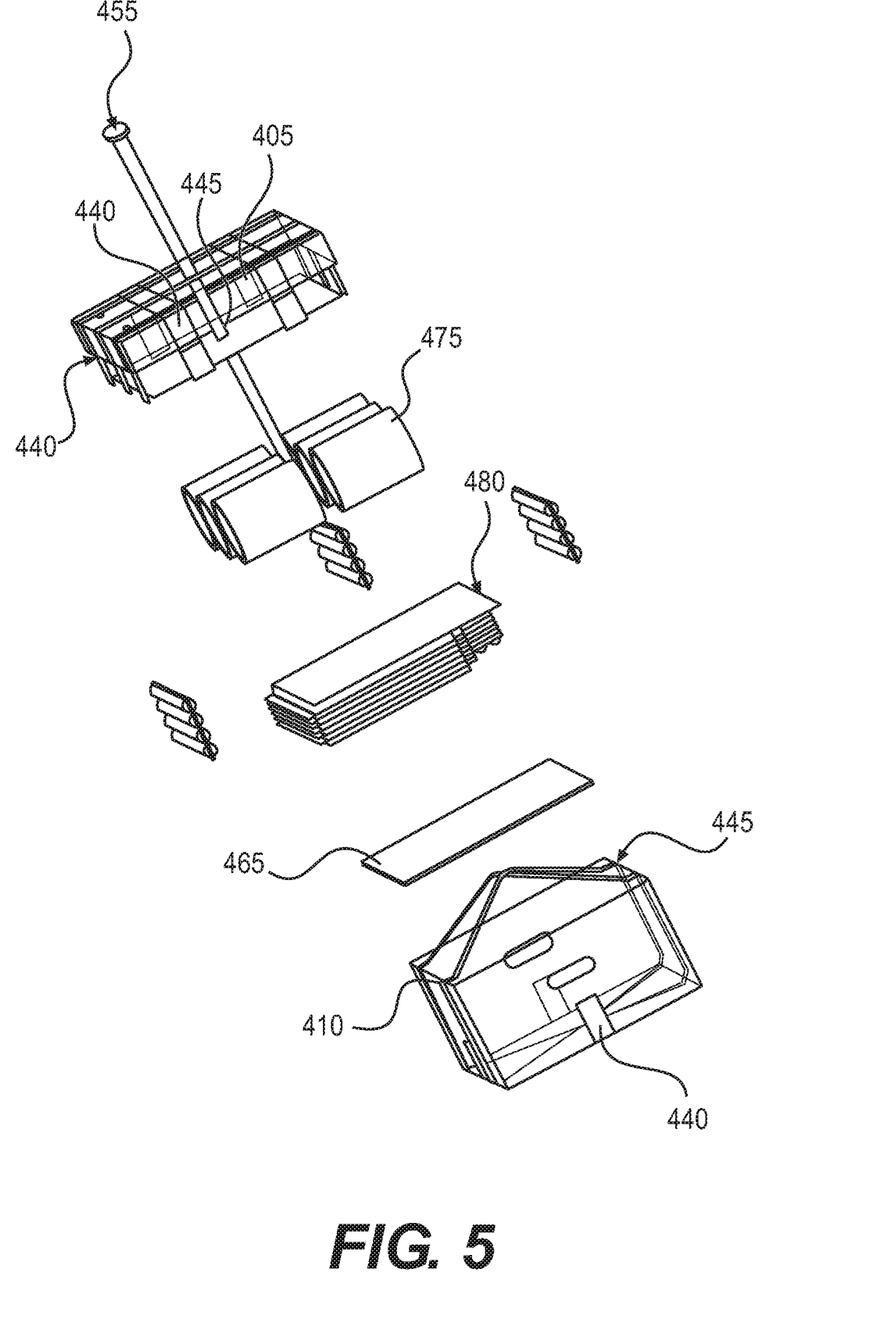
FIG. 5 is an embodiment of an exploded view of the packing of the inventive container of FIG. 4.
Figure 6:
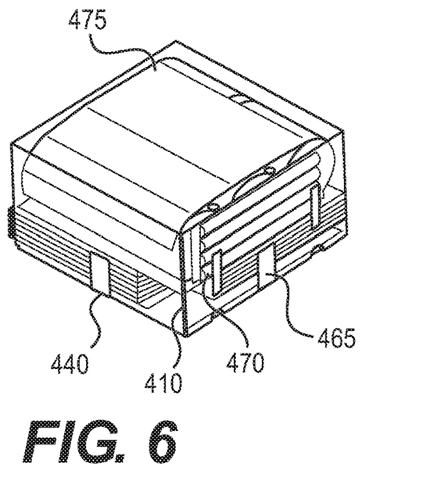
Figure 7:
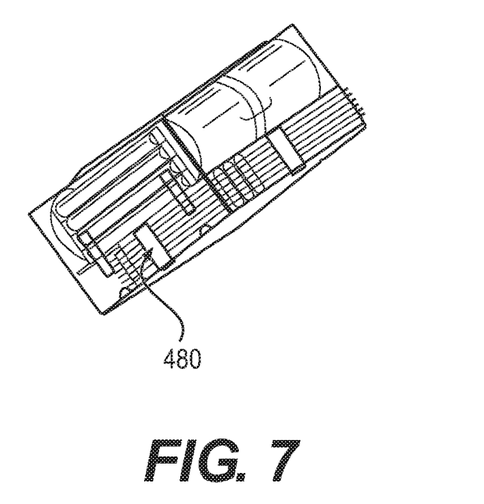
Figure 8A:
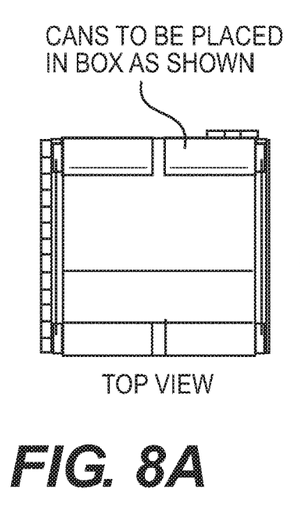
Figure 8B:
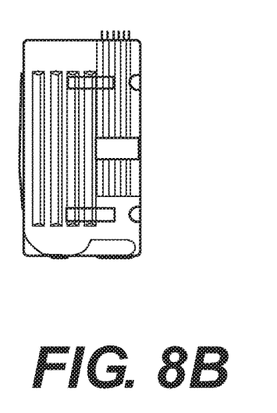
Figure 9A:
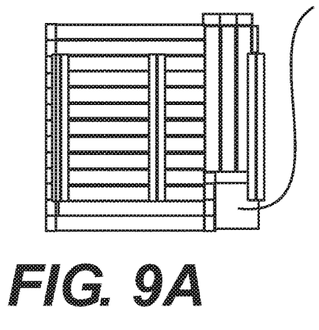
Figure 9B:
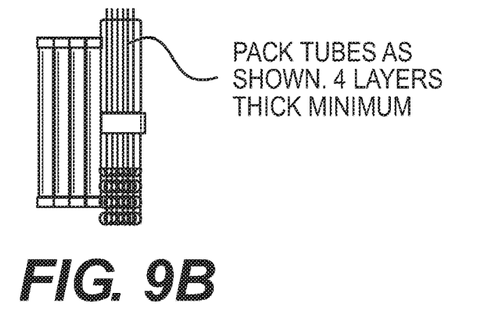
Figure 10:
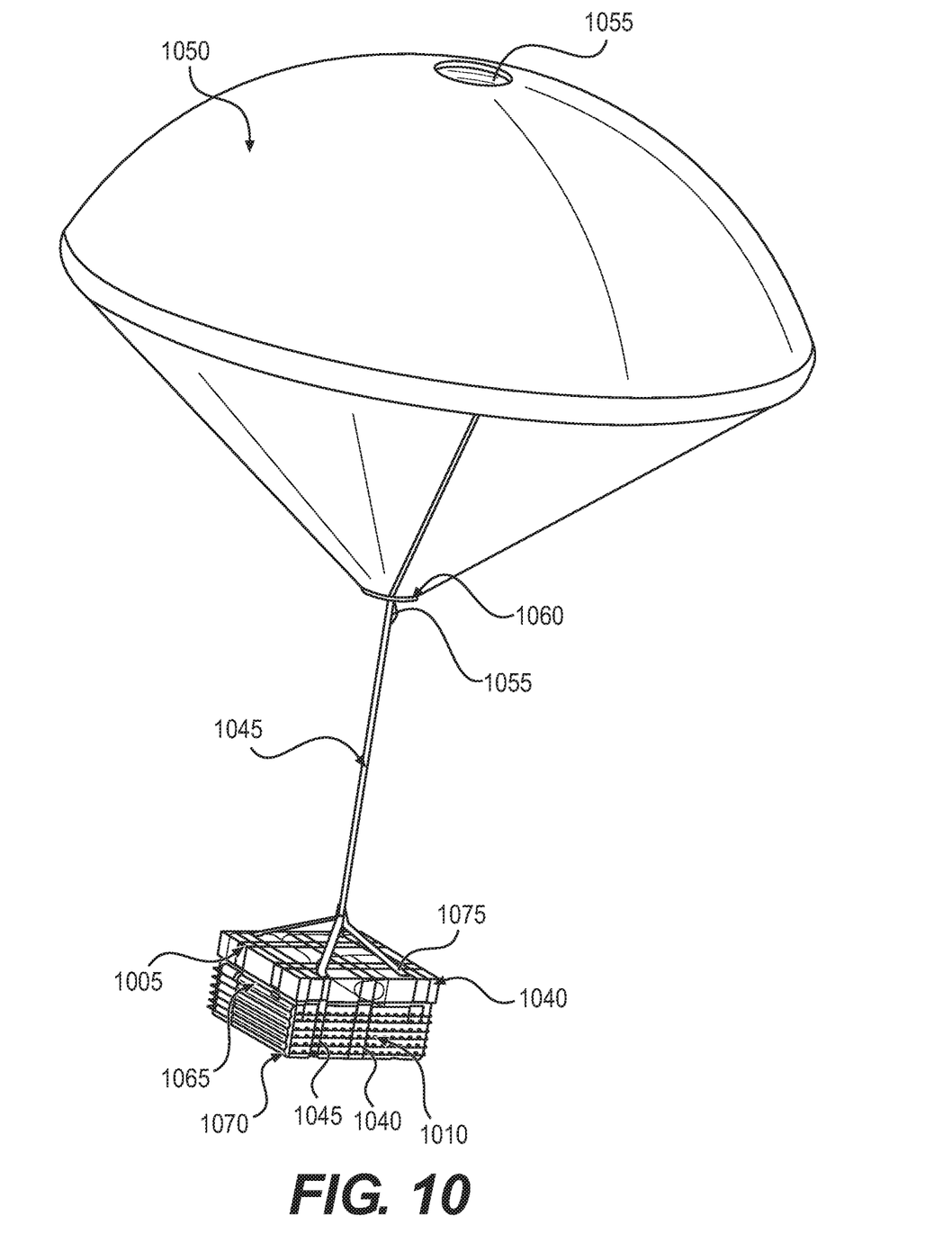
FIG. 10 is a view of another embodiment of an inventive container.
Figures 11, 12:
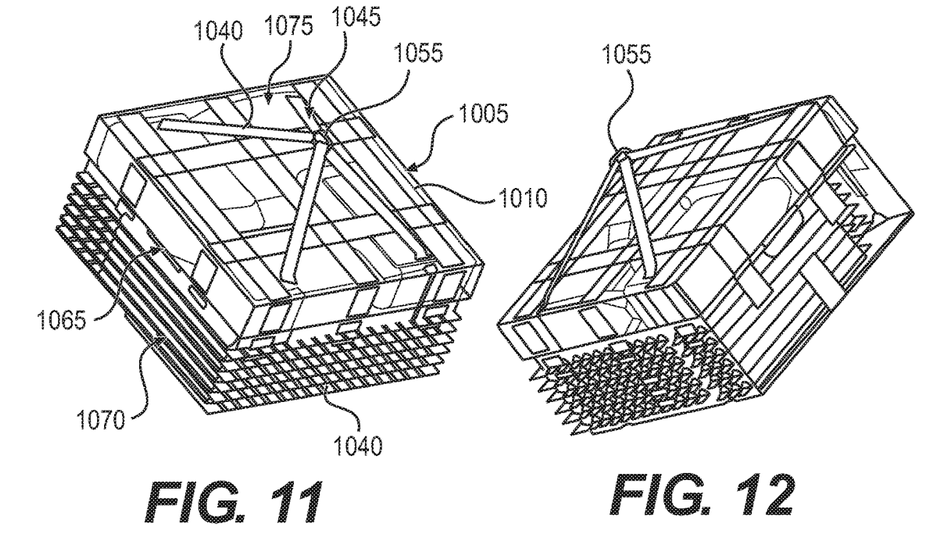
Figure 13A:
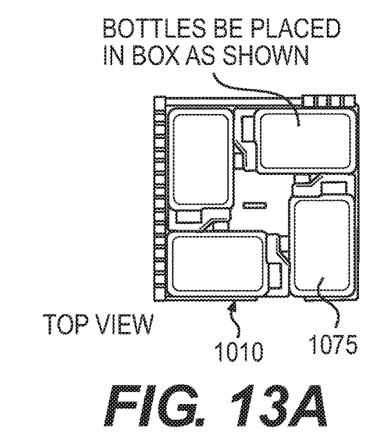
Figure 13B:
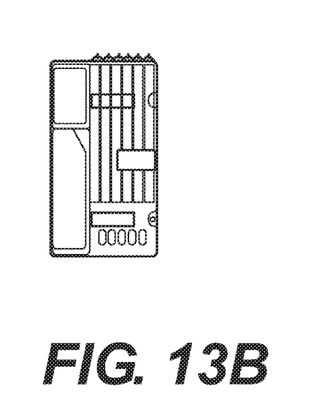
Figure 14A:
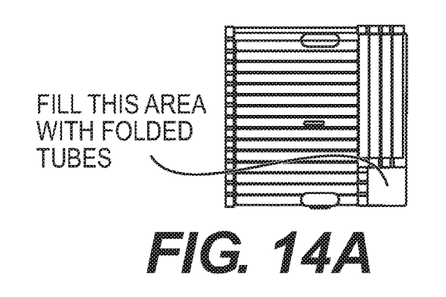
Figure 14B:
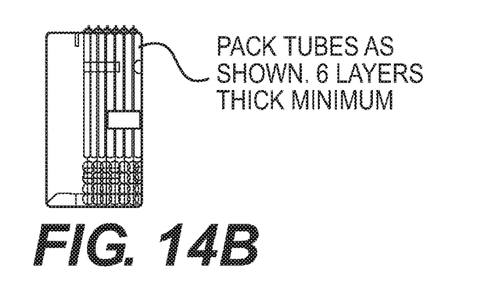

FIG. 5 displays an exploded view of an embodiment of the contents of container 400. The bottom of box 410 is preferably secured closed with securements 440 and a diaphragm 465 is placed within box 410. Box 410 is then partially filled with inflatable tubes 470. Preferably, tubes 470 provide a cushion under and around the payload 475. Tubes 470 are preferably cylinders that can be filled with air or other gas. However, tubes 470 can have other shapes, for example, spheres, hemispheres, cubes, or pyramids. Preferably, for different payloads 475, the tubes 470 are filled to different pressures. Tubes 470 may be adapted to slowly release air upon a predetermined external pressure (e.g. upon impact with the ground) or burst to further slow the descent of payload 475. Tubes 470 may be stacked in layers within box 410. While the figures may show the tubes extending beyond the edges of the box, in the preferred embodiment, the tubes will fit within the box. Payload 475 may be placed within a bag 480 prior to being packaged into box 410. The payload 475 may be cans of oil (as shown in FIG. 5), cans with other contents, other containers, or loose materials. Preferably, once box 410 is loaded, lid 405 is placed on top of box 410 and secured with securements 440. Harness 445 is then placed around container 400 and the payload is ready for delivery. FIGS. 6 through 9B depict various views of packed container 400.

FIGS. 10-14B depict an embodiment of the system that is similar to the embodiment depicted in FIGS. 4-9B, with like number indicating similar elements. However, the payload depicted in FIGS. 4-9B is six cans and the payload depicted in FIGS. 10-14B is four bottles. Other arrangements of payloads and contents are contemplated. The number, size, and configuration of the payload may be determined by the requirements of the airdrop, the contents of the payload, or another factor.

The container's decent can be monitored by radar (e.g. doppler) or tracking devices within each container (e.g. a Global Positioning System (GPS)). The container may be rendered transparent or invisible to radar by coating the container with radar absorbing materials such as, for example, carbon fiber and/or carbon nanotubes including single-walled, double-walled and/or multi-walled carbon nanotubes. The container may also have angled portions to provide packs and/or boxes with a low radar profile. The container may also be camouflaged with color to render the container invisible from the ground or at least difficult to spot and track in the air as the container descends. Preferred colors include traditional camouflage patterns, or solid colors or patterns of sky blue, snow white, gray, brown, green, sand colored, dark blue, and black. The container may also be colored differentially so that the chosen color renders the container largely invisible when looking up and difficult to see when on the ground such as, for example, by using sky blue bottoms and black tops.

The container may also contain an illuminating device to facilitate visible location of the container, particularly at night, such as a flashing Light Emitting Diode (LED), glowing film, or a reflective device, for example. The illumination device may be activated by time, temperature, pressure, or impact, for example. Alternatively, the container may be formed from a radar reflective material or a radar dissipating coating. In certain embodiments, the container is formed from or coated with a light-activated substance. The container may also contain a tracking device such as a GPS device, a Radio Frequency Identification (RFID) device, and the like to facilitate tracking of container 100 or for inventory control. Furthermore, the container may contain a noise generating device. For example, the container may contain a whistle, buzzer, or beeper that is activated as the air passes over the container, electrically, or mechanically. The noise generating device can announce the arrival and location of the container as it drops or at the drop location.

The container may include and/or contain indicia. The indicia may include a colored material or a symbol to indicate the contents thereof. For example, blue indicium may indicate that the container contains water, a Red Cross indicium may indicate that the container includes medical supplies, and the like. The indicia may also include instructions in a plurality of languages or graphical instructions for opening the container and to indicate the use of the contents thereof. In certain embodiments, the container may be colored. For example, the container may be blue, maroon, yellow, beige, etc. or patterns such as plaid or polka-dotted. Additionally, container 100 may have a solar film with a printed circuit device coupled to the container. The device can be used for communication and/or navigation proposes by receiving and sending AM/FM or shortwave signals.

The container can be reusable or recyclable or repurposed. Additionally, the container may be repurposable for a secondary use. For example, the container may be coated with a waterproof coating so the container can be used as a shelter, the container may be impregnated with a material (e.g. wax) to increase the burning time of the container, or the container can be insulated to keep in or out heat.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. A system for aerial delivery of a payload, comprising:
   a box;
   a lid adapted to close the box;
   a harness adapted to support the box and the lid;
   a parachute coupled to the harness, wherein the parachute has at least one slit adapted to control the descent of the system; and
   a plurality of inflatable tubes placed within the box and under and around the payload, wherein the plurality of inflatable tubes are adapted to cushion the payload.

2. The system of claim 1, wherein the inflatable tubes are inflated to an internal pressure dependent on the payload.

3. The system of claim 1, wherein upon impact with the ground, at least one of the inflatable tubes expels or emits its contents or bursts to further cushion the payload.

4. The system of claim 1, wherein the plurality of inflatable tubes are arranged in a plurality of layers.

5. The system of claim 1, further comprising a diaphragm positioned between a bottom of the box and the plurality of inflatable tubes.

6. The system of claim 1, further comprising a bag within which the payload is placed.

7. The system of claim 1, wherein the system is adapted to deliver the payload undamaged.

* * * * *